Patented Nov. 9, 1926.

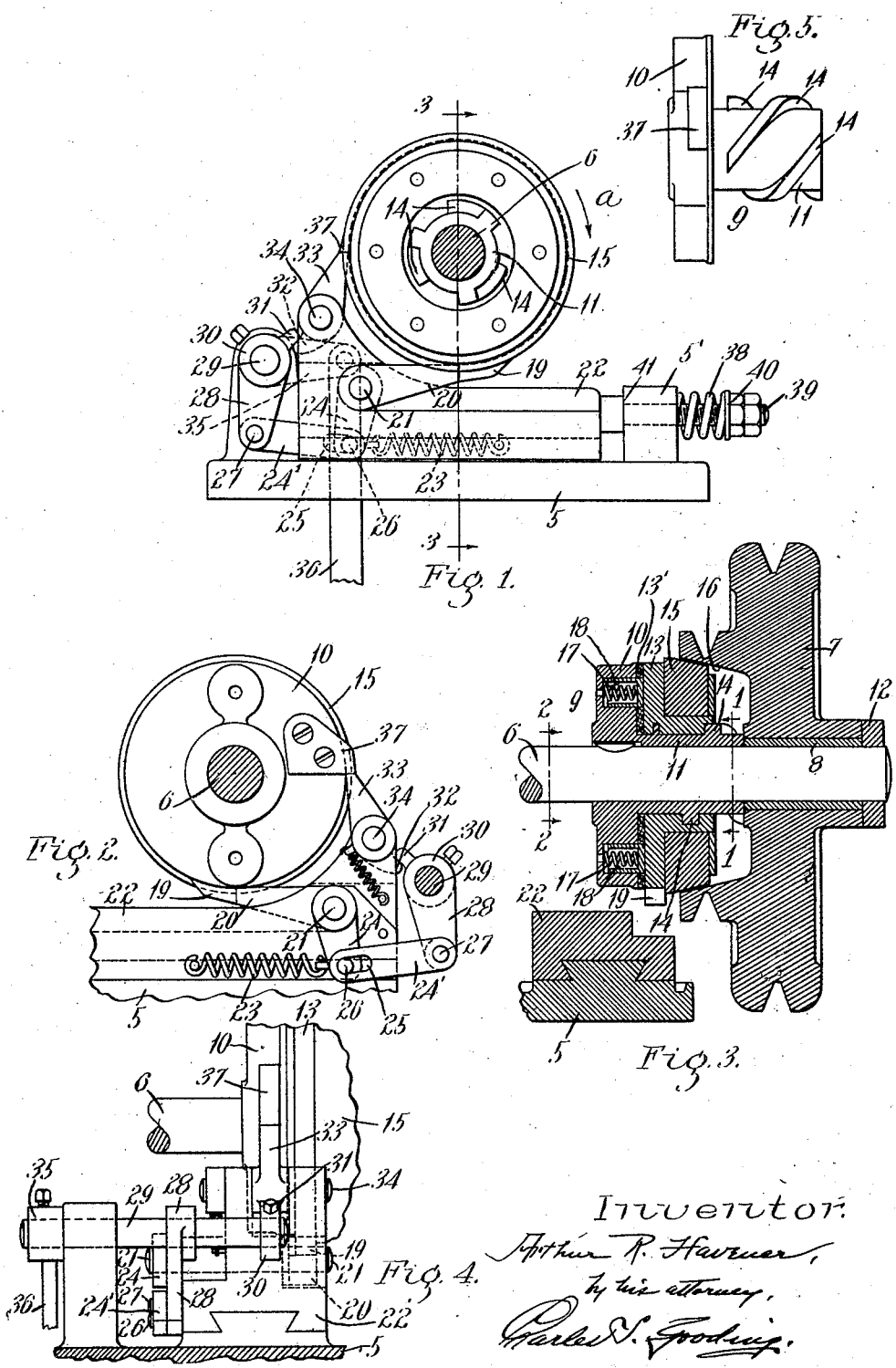

1,606,072

UNITED STATES PATENT OFFICE.

ARTHUR R. HAVENER, OF WAYLAND, MASSACHUSETTS, ASSIGNOR TO JUDSON L. THOMSON MANUFACTURING CO., OF WALTHAM, MASSACHUSETTS, A CORPORATION OF MASSACHUSETTS.

CLUTCH.

Application filed November 12, 1923. Serial No. 674,172.

This invention relates to an improved clutch for alternately locking together a rotary driving member and a rotary driven member.

The object of the invention is to firmly lock the said members together and to disengage them from each other with very slight noise, the clutch being particularly adapted to rapidly rotating machines which it is desired to start and stop quickly.

The invention consists primarily in interposing a clutch device between the driving member and the driven member of a clutch, which clutch device has screw-threaded engagement with the driven member so that assuming the clutch to be in operation and the rotation of the clutch device to be stopped, said clutch device will screw itself out of engagement with the driving member and the driven member will thus be stopped.

The invention further consists in the means for causing the clutch device to be moved into engagement with the driving member when the clutch device has been released to allow it to be so moved.

The invention further consists in the combination and arrangement of parts set forth in the following specification and particularly pointed out in the claims thereof.

Referring to the drawings:

Figure 1 is a sectional elevation taken on the line 1—1 of Fig. 3.

Fig. 2 is a sectional elevation taken on the line 2—2, Fig. 3.

Fig. 3 is a sectional elevation taken on the line 3—3, Fig. 1.

Fig. 4 is a side elevation broken away and viewed from the left of Fig. 1.

Fig. 5 is a side elevation of the driven member of the clutch as viewed from the left of Figure 1.

Like numerals refer to like parts throughout the several views of the drawings.

In the drawings, 5 is the frame of the machine. 6 is the shaft to be driven, 7 is a pulley rotatably mounted upon a bushing 8 on the shaft 6, said pulley constituting a driving member, and 9 is a driven member consisting of a cylindrical head 10 with a hub 11 thereon and fast to the shaft 6. The driving member 7 is prevented from moving longitudinally of the shaft 6 by a collar 12 at one end thereof and by the hub 11 at the other end thereof. A clutch device 13 is interposed between the driving member 7 and the driven member 9 and is mounted upon the hub 11 and is connected to said hub by screw threads 14 of steep pitch. The member 13 has a frictional collar 15 thereon of frusto-conical formation, the periphery of which is adapted to engage a frusto-conical recess 16 in the driving member 7 when the clutch is operating to drive the shaft 6.

Normally the frictional collar 15 is out of engagement with the frusto-conical recess 16 as illustrated in Fig. 3.

In order to move the clutch device longitudinally of the hub 11 along the screw threads 14 and into engagement with the frusto-conical surface 16 of the driving member, springs 17 are provided located in recesses 18 in the head 10 of the driven member. In order to stop the rotation of the clutch device 13, a lug 19 is provided upon its periphery which is adapted to be engaged by an arm 20 fast to a shaft 21 adapted to rock on a support 22 slidably mounted on the frame 5 as illustrated in Fig. 3. The arm 20 is rocked in one direction by a spring 23 which is connected to an arm 24 fast to the shaft 21. The arm 20 is rocked in the opposite direction or out of engagement with the lug 19 by a link 24' which is provided with a slot 25 into which a pin 26 on the arm 24 projects. The other end of the link 24' is pivotally connected by a pin 27 to an arm 28 fast to a rock shaft 29 which has a collar 30 fast thereto with a tooth 31 thereon adapted to engage a tooth 32 on an arm 33 which is fastened to a rock shaft 34. The rock shafts 34 and 21 are journalled to rock in bearings on the slide member 22, while the rock shaft 29 is journalled to rock in bearings on the frame of the machine. The rock shaft 29 has a rocking motion imparted thereto by an arm 35 which is fastened thereto and is connected by a rod 36 to a treadle not shown in the drawings but well known to those skilled in the art. The arm 33 is adapted to be engaged by a stop plate 37 fast to the head 10 of the driven member 9.

The general operation of the mechanism hereinbefore described is as follows:—Assuming the parts to be in the relative positions illustrated in the drawings and the treadle is operated to move the rod 36 downwardly, the arm 35 will cause the shaft 29 to be rocked so as to move the arm 33 and the arm 20 out of engagement with the stop plate 37 and the lug 19 respectively.

As soon as this takes place, the springs 17 in the head 10 of the driven member 9 will push the clutch device 13 toward the right, Fig. 3, into engagement with the frusto-conical surface 16 of the driving member 7, the driving member being at this time rotating in the direction of the arrow $a$, Fig. 1, the clutch device will be screwed along the screw threads 14, thus forcing the friction collar 15 of the clutch device 13 very firmly into engagement with the frusto-conical surface 16 of the driving member 7, thus the driving member will become locked to the driven member 9, and upon continued rotation of the driving member, the clutch device 13, the driven member 9 and the shaft 6 will all be rotated in the direction of the arrow $a$. When it is desired to stop the rotation of the shaft by disengaging the driving member from the driven member, the operator releases the treadle which causes the rod 36 to be moved upwardly and to reverse the movement of the arms 20 and 33 so as to allow the arm 20 to be brought into the path of rotation of the lug 19 on the clutch device and at the same time the arm 33 will move into the path of the stop plate 37 all as illustrated in Figs. 1 and 2. As soon as the lug 19 engages the arm 20, the clutch device 13 will be screwed along the threads 14 compressing the springs 17 and moving the frusto-conical surface of the friction collar 15 out of engagement with the frusto-conical surface 16 of the driving member, thus the driven member and the clutch device will be out of engagement with the driving member and the shaft will stop rotating. Any rebound of the driven member 9 will be taken up and eliminated by the stop plate 37 engaging the arm 33. Any shock upon the support for the stop arm 20 will be taken up by a shock absorber consisting of a spring 38, Fig. 1, which encircles a rod 39 fast to the slide member 22. The spring is interposed between nuts 40 and a portion 5' of the frame 5. A portion of the rod 39 is shouldered at 41 to engage the portion 5' of the frame when the parts are in the relative positions illustrated in Fig. 1.

A leather washer 13' is inserted between the cylindrical head 10 of the driven member 9 and the clutch device 13. The object of this leather washer 13' is to prevent noise in the operation of the clutch when the clutch device is thrown out of engagement with the driving member 7 and into the position illustrated in Fig. 3.

I claim:

1. A clutch having, in combination, a shaft, a driving member rotatable relatively thereto, a driven member fast thereto, a clutch device having screw-threaded engagement with said driven member and movable relatively to said shaft and longitudinally upon said driven member into and out of engagement with said driving member, a lug on said clutch device and an arm adapted to be thrown into and out of engagement with said lug whereby said clutch device may be moved out of engagement with said driving member, compression springs mounted on said driven member to push said clutch device into engagement with said driving member when said arm is moved out of engagement with said lug, a lug on said driven member and an arm adapted to be thrown into and out of engagement with said lug whereby said driven member may be stopped from rotation in a direction opposite to that of the direction of rotation of said driving member, and means to simultaneously operate said arms to disengage them from their respective lugs and hold them out of contact therewith.

2. A clutch having, in combination, a shaft, a driving member rotatable relatively thereto, a driven member fast thereto, a clutch device having screw-threaded engagement with said driven member and movable relatively to said shaft into and out of engagement with said driving member, a lug on said clutch device and an arm adapted to be thrown into and out of engagement with said lug whereby said clutch device may be moved out of engagement with said driving member, compression springs mounted on said driven member to push said clutch device longitudinally upon said driven member into engagement with said driving member when said arm is moved out of engagement with said lug, a lug on said driven member, an arm adapted to be thrown into and out of engagement with said lug whereby said driven member may be stopped from rotation in a direction opposite to that of the direction of rotation of said driving member, and mechanism including a treadle rod to simultaneously operate said arms to disengage them from their respective lugs and hold them out of contact therewith, whereby when said treadle rod is moved in one direction, said arms will be simultaneously moved out of the path of said lugs and vice versa.

3. A clutch having, in combination, a shaft, a driving member rotatable relatively thereto, a driven member fast thereto, a clutch device having screw-threaded engagement with said driven member and movable relatively to said shaft into and out of engagement with said driving member, a lug on said clutch device and an arm adapted to be thrown into and out of engagement with said lug whereby said clutch device may be moved out of engagement with said driving member, compression springs mounted on said driven member to push said clutch device longitudinally upon said driven member into engagement with said driving member when said arm is moved out of engagement with said lug, a lug on said driven member, an arm adapted to be thrown into and out of engagement with said lug whereby said driven member may be stopped from rotation in a direction opposite to that of the direction of rotation of said driving member, means to simultaneously operate said arms to disengage them from their respective lugs and hold them out of contact therewith, a slide upon which said arms are mounted, a stationary member upon which said slide is mounted, and a shock absorber interposed between said slide and stationary member.

In testimony whereof I have hereunto set my hand.

ARTHUR R. HAVENER.